United States Patent
Yang et al.

(10) Patent No.: US 12,507,089 B2
(45) Date of Patent: Dec. 23, 2025

(54) INFORMATION SYNCHRONIZATION METHOD AND APPARATUS, ELECTRONIC DEVICE, AND COMPUTER READABLE STORAGE MEDIUM

(71) Applicant: ZTE Corporation, Shenzhen (CN)

(72) Inventors: Li Yang, Shenzhen (CN); Zijiang Ma, Shenzhen (CN); Yin Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 538 days.

(21) Appl. No.: 17/905,019

(22) PCT Filed: Nov. 12, 2020

(86) PCT No.: PCT/CN2020/128424
§ 371 (c)(1),
(2) Date: Aug. 25, 2022

(87) PCT Pub. No.: WO2021/169412
PCT Pub. Date: Sep. 2, 2021

(65) Prior Publication Data
US 2023/0116823 A1    Apr. 13, 2023

(30) Foreign Application Priority Data
Feb. 25, 2020   (CN) .......................... 202010114371.8

(51) Int. Cl.
*H04W 24/04*   (2009.01)
*H04W 36/30*   (2009.01)

(52) U.S. Cl.
CPC ......... *H04W 24/04* (2013.01); *H04W 36/305* (2018.08)

(58) Field of Classification Search
CPC ........................... H04W 24/04; H04W 36/305
See application file for complete search history.

(56) References Cited

U.S. PATENT DOCUMENTS

| | | | |
|---|---|---|---|
| 2014/0056243 A1* | 2/2014 | Pelletier | H04L 5/0032 370/329 |
| 2020/0059395 A1 | 2/2020 | Chen | |
| 2023/0413088 A1* | 12/2023 | Sedin | H04W 24/08 |

FOREIGN PATENT DOCUMENTS

CN    110798867 A    2/2020

OTHER PUBLICATIONS

International Search Report for corresponding application PCT/CN2020/128424 filed Nov. 12, 2020; Mail date Feb. 18, 2021.
(Continued)

*Primary Examiner* — Duc C Ho
(74) *Attorney, Agent, or Firm* — CANTOR COLBURN LLP

(57) ABSTRACT

An information synchronization method applied to a secondary node is provided. The method includes: configuring first information, wherein the first information includes at least one of: whether a Signaling Radio Bearer (SRB) k corresponding to the secondary node has a capability of supporting fast recovery of a primary radio link failure; and whether the SRBk corresponding to the secondary node is in a state of supporting fast recovery of the primary radio link failure, wherein k is any integer greater than or equal to 3, and different secondary nodes corresponding to the same master node correspond to different values of k; and sending a first message to a first master node, wherein the first message carries the first information. An information synchronization apparatus, an electronic device, and a computer readable storage medium are also provided.

20 Claims, 8 Drawing Sheets

---

400

Configure first information, the first information including at least one of: whether an SRBk corresponding to a secondary node has a capability of supporting fast recovery of a primary radio link failure; and whether the SRBk corresponding to the secondary node is in a state of supporting fast recovery of the primary radio link failure, where k is any integer greater than or equal to 3, and different secondary nodes corresponding to the same master node correspond to different values of k

401

Send a first message to a first master node, the first message carrying the first information

(56) References Cited

OTHER PUBLICATIONS

NEC, "Configuration of fast MCG recovery", 3GPP TSG-RAN WG2 #107bis R2-1912984 Chongqing, China, Oct. 14-18, 2019; R2-1912984.

NEC, "Network configuration for fast MCG recovery", 3GPP TSG-RAN WG2 #108, Reno, USA, Nov. 18-22, 2019; R2-1915244.

NEC, "Usage of Requested Fast MCG Recovery via SRB3", 3GPP TSG-RAN WG3 #107-e, E-meeting, Feb. 24-Mar. 6, 2020, R3-200349.

ZTE Corporation, "Configuration for MCG fast recovery", 3GPP TSG RAN WG2 Meeting #108, Reno, Nevada, USA Nov. 18-22, 2019, R2-1914826.

ZTE Corporation, "Consideration on inter-MN handover with SN change", 3GPP TSG-RAN WG2 Meeting#99bis, Prague, Czech republic, Oct. 9-13, 2017, R2-1710330.

ZTE Corporation, "Further issues on MCG fast recovery", 3GPP TSG RAN WG2 Meeting #109e, Online, Feb. 24-Mar. 6, 2020, R2-2001266.

European Search Report for Application No. 20921659.7, dated Jul. 11, 2023, 11 pages.

Huawei, "Fast MCG link Recovery with SRB3 and split SRB1" 3GPP TSG-RAN3 Meeting #106 Reno, USA, Nov. 18-22, 2019, R3-197227, 4 pages.

Huawei, "Fast MCG link Recovery with SRB3" 3GPP TSG-RAN3 Meeting #106 Reno, USA, Nov. 18-22, 2019, R3-197782, 40 pages.

* cited by examiner

Receive a fifth message sent by a first master node, the fifth message carrying first information corresponding to each of at least one secondary node corresponding to the first master node, and the first information including at least one of: whether an SRBk corresponding to the secondary node has a capability of supporting fast recovery of a primary radio link failure; and whether the SRBk corresponding to the secondary node is in a state of supporting fast recovery of the primary radio link failure, where k is any integer greater than or equal to 3, and different secondary nodes corresponding to the same master node correspond to different values of k

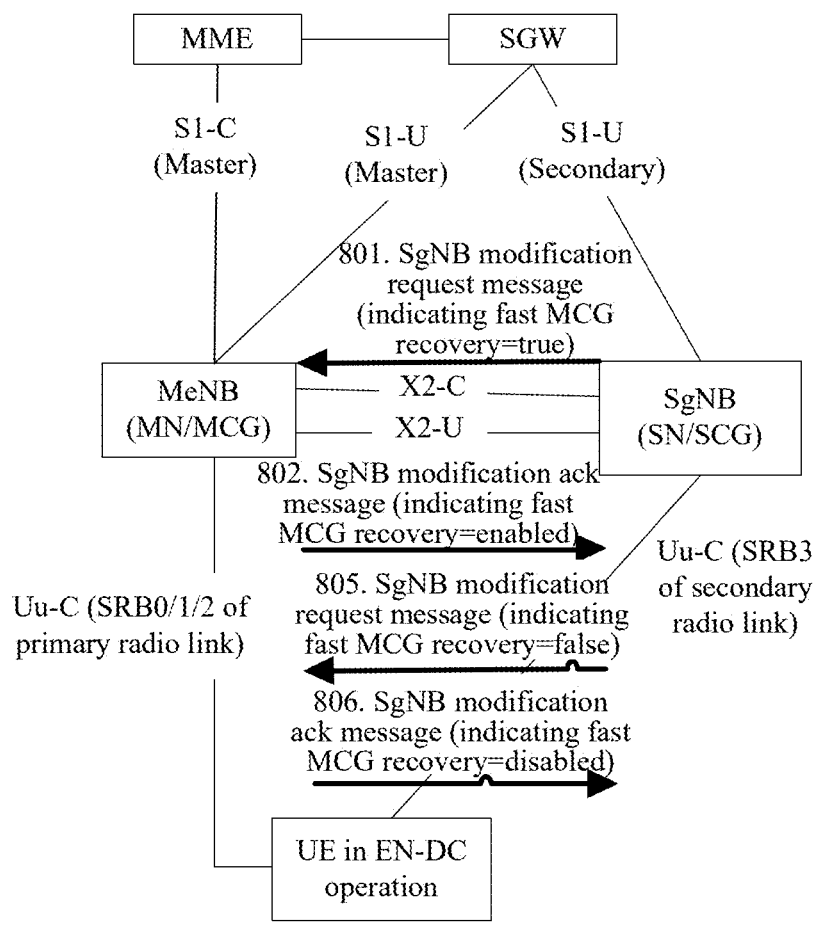

Fig. 8

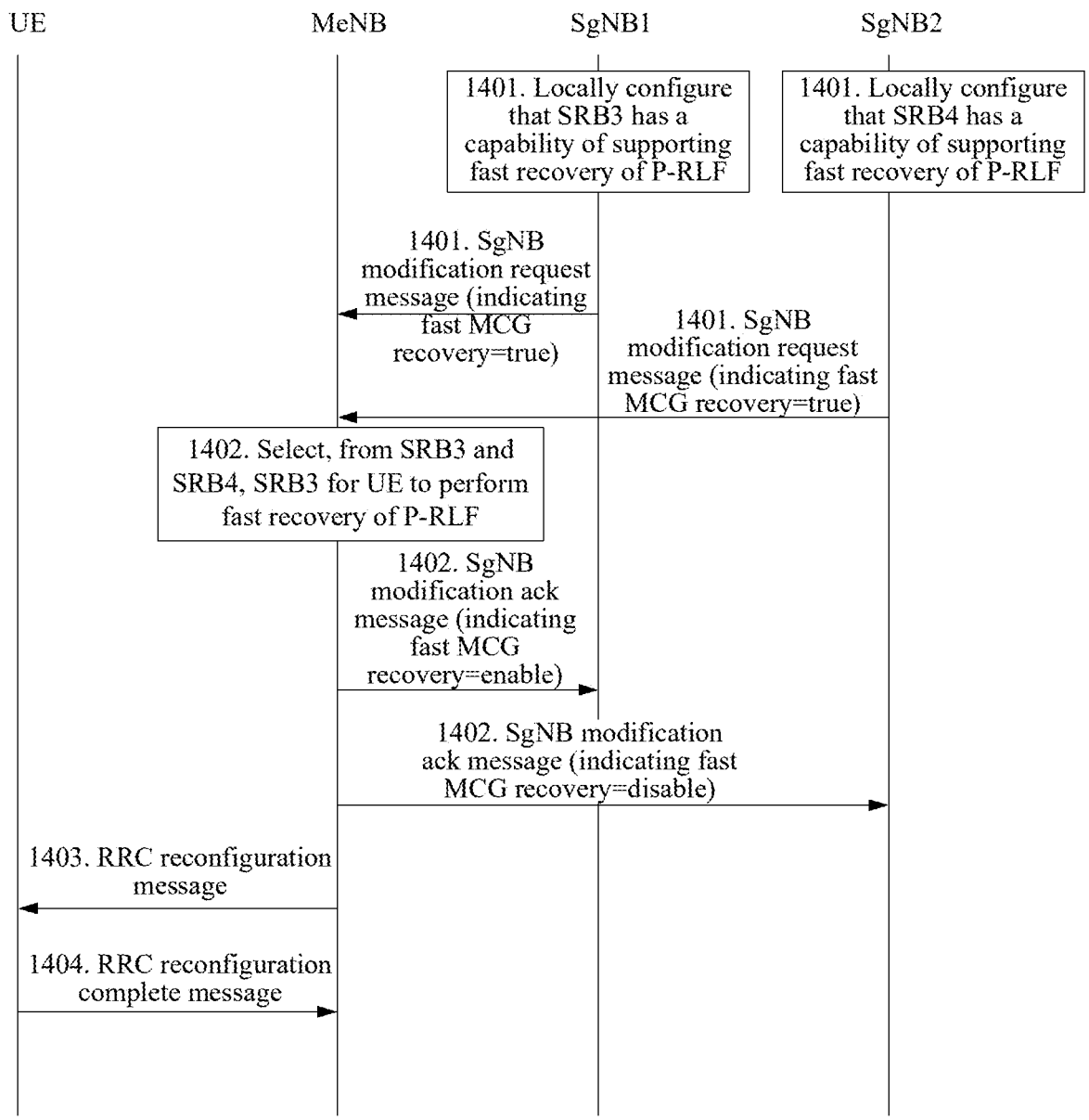
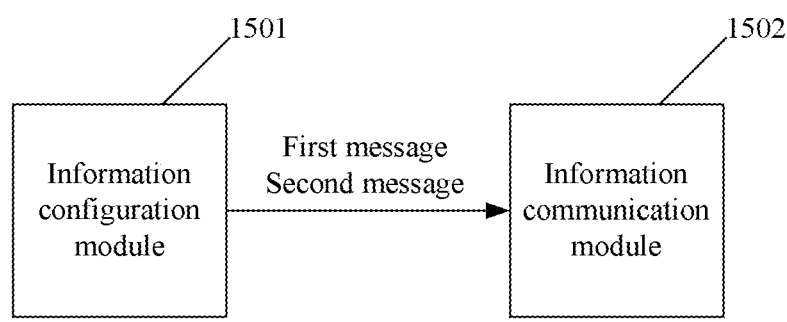

INFORMATION SYNCHRONIZATION METHOD AND APPARATUS, ELECTRONIC DEVICE, AND COMPUTER READABLE STORAGE MEDIUM

CROSS REFERENCE

This application is a National Stage Filing of the PCT International Application No. PCT/CN2020/128424 filed on Nov. 12, 2020, which claims priority to Chinese Application No. 202010114371.8 filed on Feb. 25, 2020, the entirety of which is herein incorporated by reference.

TECHNICAL FIELD

Embodiments of the present disclosure relate to the field of communications, and in particular, to an information synchronization method and apparatus, an electronic device, and a computer readable storage medium.

BACKGROUND

In a dual-connectivity or multi-connectivity operation, once User Equipment (UE) encounters a Primary Radio Link Failure (P-RLF) at a Master Node (MN)/Master Cell Group (MCG) side, the UE may execute fast recovery of the primary radio link failure via a Signaling Radio Bearer (SRB) 3 at a Secondary Node (SN)/Secondary Cell Group (SCG) side, then the SN further coordinates and interacts with the MN by executing an Xn Application Protocol (XnAP) procedure via an X2 interface, or by executing an Xn Application Protocol (X2AP) procedure via an X2 interface, and then the MN, instead of performing RRC re-establishment via an SRB1 according to a conventional approach, performs RRC reconfiguration via the SRB3. The fast recovery of the primary radio link failure depends on at least one of: whether the SRB3 at the SN/SCG side has a capability of supporting fast recovery of the primary radio link failure; and whether the SRB3 at the SN/SCG side is in a state of supporting fast recovery of the primary radio link failure. However, in the related art, the MN/MCG side does not have knowledge of the information, so that an erroneous configuration may occur, thereby resulting in a low success rate of fast recovery of the primary radio link failure.

SUMMARY

Embodiments of the present disclosure provide an information synchronization method and apparatus, an electronic device, and a computer readable storage medium.

According to a first aspect, the embodiments of the present disclosure provide an information synchronization method applied to a secondary node, the method including:
configuring first information; and
sending a first message to a first master node, wherein the first message carries the first information;
wherein the first information includes at least one of:
whether a Signaling Radio Bearer (SRB) k corresponding to the secondary node has a capability of supporting fast recovery of a primary radio link failure; and
whether the SRBk corresponding to the secondary node is in a state of supporting fast recovery of the primary radio link failure;
k is an integer greater than or equal to 3, and different secondary nodes corresponding to the same master node correspond to different values of k.

According to a second aspect, the embodiments of the present disclosure provide an information synchronization method applied to a first master node, the method including:
receiving at least one first message sent by at least one secondary node, wherein each of the at least one first message carries first information, and the first information includes at least one of: whether a Signaling Radio Bearer (SRB) k corresponding to the secondary node has a capability of supporting fast recovery of a primary radio link failure; and whether the SRBk corresponding to the secondary node is in a state of supporting fast recovery of the primary radio link failure, k is any integer greater than or equal to 3, and different secondary nodes corresponding to the same master node correspond to different values of k;
determining third information according to the first information in the at least one first message sent by the at least one secondary node, wherein the third information includes information indicating whether the first master node enables or configures or activates User Equipment (UE) to perform fast recovery of the primary radio link failure; and
in a case where the third information is information indicating that the first master node enables or configures or activates the UE to perform fast recovery of the primary radio link failure, selecting, from the at least one SRBk indicated in the first information carried in the at least one first message, at least one SRBk for the UE to perform fast recovery of the primary radio link failure.

According to a third aspect, the embodiments of the present disclosure provide an information synchronization method applied to UE, the method including:
receiving a third message sent by a first master node or a secondary node, and returning a fourth message to the first master node or the secondary node, wherein the third message carries at least one SRBk selected by the first master node and third information, and the third information includes information indicating whether the first master node enables or configures or activates the UE to perform fast recovery of a primary radio link failure.

According to a fourth aspect, the embodiments of the present disclosure provide an information synchronization method applied to a second master node, the method including:
receiving a fifth message sent by a first master node;
wherein the fifth message carries first information corresponding to each of at least one secondary node corresponding to the first master node, and the first information includes at least one of:
whether a Signaling Radio Bearer (SRB) k corresponding to the secondary node has a capability of supporting fast recovery of a primary radio link failure; and
whether the SRBk corresponding to the secondary node is in a state of supporting fast recovery of the primary radio link failure;
k is any integer greater than or equal to 3, and different secondary nodes corresponding to the same master node correspond to different values of k.

According to a fifth aspect, the embodiments of the present disclosure provide an electronic device, including:
at least one processor; and
a storage device, on which at least one program is stored, wherein when the at least one program is executed by the at least one processor, the at least one processor implements any one of the information synchronization methods mentioned above.

According to a sixth aspect, the embodiments of the present disclosure provide a computer readable storage medium, on which a computer program is stored, wherein the program implements any one of the foregoing information synchronization methods when being executed by a processor.

BRIEF DESCRIPTION OF THE DRAWINGS

The accompanying drawings are used to provide a further understanding of the embodiments of the present disclosure, and constitute a part of the description. The drawings are used to explain the present disclosure together with the embodiments of the present disclosure, but do not constitute a limitation to the present disclosure. The above and other features and advantages will become more apparent to those having ordinary skill in the art based on the detailed description of the exemplary embodiments with reference to the accompanying drawings. In the drawings:

FIG. 7 is a flowchart of another information synchronization method according to the embodiments of the present disclosure;

FIG. 8 is a flowchart of an information synchronization method according to Example 1 of the embodiments of the present disclosure;

FIG. 14 is a flowchart of an information synchronization method according to Example 7 of the embodiments of the present disclosure;

FIG. 15 is a constitutional block diagram of a secondary node according to the embodiments of the present disclosure;

DETAILED DESCRIPTION

To make those having ordinary skill in the art better understand the technical solutions of the embodiments of the present disclosure, the information synchronization method and apparatus, the electronic device, and the computer readable storage medium provided in the embodiments of the present disclosure are described in detail below with reference to the accompanying drawings.

Exemplary embodiments will be described more fully hereinafter with reference to the accompanying drawings, but may be embodied in various forms and should not be construed as being limited to the embodiments set forth herein. Rather, these embodiments are provided so that this disclosure will be thorough and complete, and will fully convey the scope of the disclosure to those having ordinary skill in the art.

The embodiments of the present disclosure and the features in the embodiments may be combined with each other without conflict.

As used herein, the term "and/or" includes any and all combinations of at least one of the associated listed items.

The terminology used herein is for the purpose of describing exemplary embodiments only and is not intended to be limiting of the disclosure. As used herein, the singular forms "a", "an" and "the" are intended to include the plural forms as well, unless the context clearly indicates otherwise. It will be further understood that the terms "includes" and/or "made of . . . ", when used in this description, specify the presence of stated features, integrals, steps, operations, elements, and/or components, but do not preclude the presence or addition of at least one other feature, integral, step, operation, element, component, and/or a combination thereof.

Unless otherwise defined, all terms (including technical and scientific terms) used herein have the same meaning as commonly understood by those having ordinary skill in the art. It will also be understood that terms, such as those defined in commonly used dictionaries, should be interpreted as having a meaning that is consistent with their meaning in the context of the relevant art and this disclosure, and will not be interpreted in an idealized or overly formal sense unless expressly so defined herein.

Figure 1:
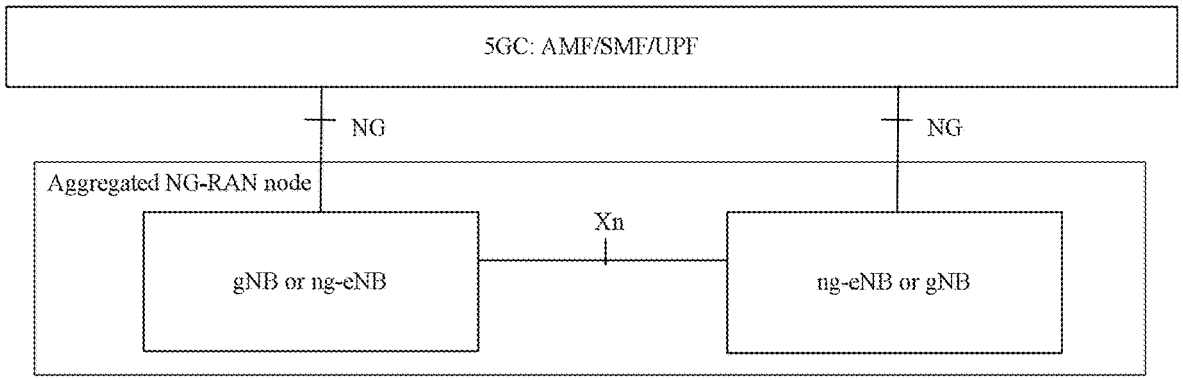
FIG. 1 is a diagram of a 5G networking architecture provided in the related art.

As shown in FIG. 1, the Fifth Generation (5G) mobile communication cellular network dedicated to the 3rd Generation Partnership Project (3GPP) mainly includes a 5G Core (5GC) (such as an Access Mobility Function (AMF), a Session Management Function (SMF), a User Plane Function (UPF), etc.) and a Next Generation-Radio Access Network (NG-RAN) node, wherein the 5G core network and the NG-RAN node are connected via an NG interface (standardized in 3GPP, see TS38.413). The NG-RAN node includes at least two types of Radio Access Technology (RAT) nodes: a gNB (NR) and an ng-eNB (Universal Mobile Telecommunications System (UMTS) Evolved-UMTS Terrestrial Radio Access (E-UTRA)), and the RAT nodes are connected via an Xn interface (standardized in 3GPP, see TS38.423). Similarly, a Fourth Generation (4G)

mobile communication cellular network dedicated to the 3GPP mainly includes an Evolved Packet Core (EPC) (such as Mobility Management (MME), Serving Gateway (SGW), etc.) and a RAN node, where the EPC is connected to the RAN node via an S1 interface (standardized in 3GPP, see TS36.413). The RAN node includes a single type of RAT node, i.e., an eNB (E-UTRA), and the eNBs are connected via an X2 interface (standardized in 3GPP, see TS36.423).

In a 5G single-connectivity operation, UE is connected to or is served by a single NG-RAN node, and registers with an anchoring 5GC entity. The UE in a single-connectivity operation may encounter a radio link failure, that is to say, a Radio Link Failure (RLF) occurs on the MN/MCG side due to a poor local radio condition. When an RLF occurs on the MN/MCG side, the UE performs a Radio Resource Control (RRC) re-establishment procedure via an SRB0 so as to restore a serving radio link and continue data transmission. In case the RRC re-establishment procedure fails, the UE will transition back to an idle mode.

Figure 2:
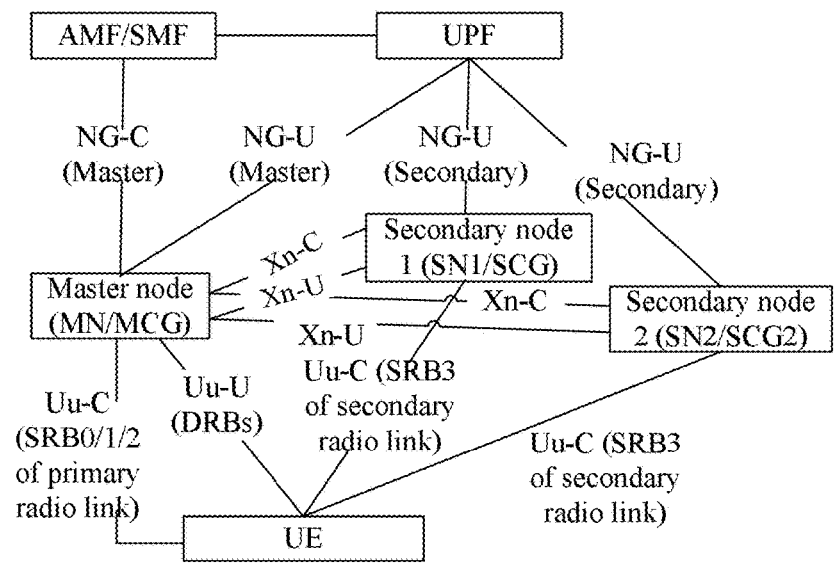
FIG. 2 is a diagram of a 5G multi-connectivity networking architecture provided in the related art.

As shown in FIG. 2, in a multi-connectivity or dual-connectivity operation (standardized in 3GPP, see TS37.340), UE is connected to more than one NG-RAN node simultaneously, or is served by more than one NG-RAN node simultaneously, that is to say, the UE is served by at least one MN together with at least one SN. In a Uu air interface (standardized in 3GPP, see TS38.331 and TS36.331), the MN provides to the UE an MCG configuration and resource for a primary radio link, and an SN provides to the UE a Secondary Cell Group (SCG) configuration and resource for a secondary radio link. On a primary radio link, Downlink (DL) or Uplink (UL) user data is transmitted via a Data Radio Bearer (DRB), and DL or UL signaling data is transmitted via an SRB0, an SRB1 and an SRB2. On a secondary radio link, DL or UL user data is also transmitted via another set of DRBs, and DL or UL signaling data is transmitted via an SRB3, which is different from the SRB 0/1/2 and has different configurations and resources, and there is no SRB 0/1/2 on the SN/SCG side.

Similar to the single-connectivity case, due to poor local radio conditions, a UE in a dual-connectivity or multi-connectivity operation may encounter a primary radio link failure, i.e., a P-RLF, at the MN/MCG side, and when the primary radio link failure occurs, the UE usually executes an RRC re-establishment procedure via an SRB0 at the MN/MCG side, so as to recover the primary radio link and an MCG configuration and resource thereof, thereby continuing data transmission in the dual-connectivity or multi-connectivity.

As an enhanced function of the Rel-16, the UE may be enabled or configured or activated by an MN/SN to execute an RRC re-establishment procedure via an SRB3 at the SN/SCG side, so that fast recovery of a primary radio link failure, i.e., Fast MCG Discovery, can be further performed. As long as the SRB3 still works and is in a radio condition better than that of an SRB0, fast recovery of the primary radio link failure provides a shorter recovery delay and a higher robustness than a traditional SRB0-based recovery.

Figure 3:
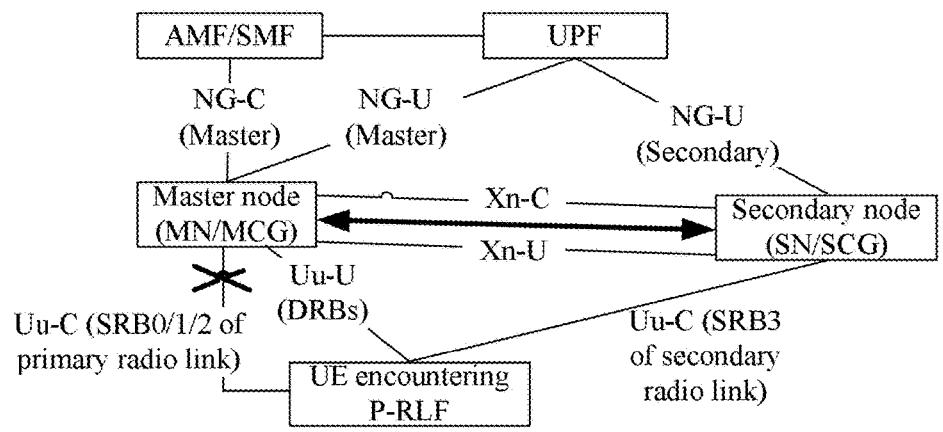
FIG. 3 is a schematic diagram of a UE encountering a primary radio link failure in a dual-connectivity operation provided in the related art.

For example, as shown in FIG. 3, in a dual-connectivity operation, once the UE encounters a primary radio link failure at the MN/MCG side, the UE may perform fast recovery of the primary radio link failure via an SRB3 at the SN/SCG side, then the SN coordinates and interacts with the MN by executing an XnAP procedure via an Xn interface, or by executing an X2AP procedure via an X2 interface, and then the MN, instead of performing RRC re-establishment via an SRB1 according to a conventional approach, performs RRC reconfiguration via the SRB3. The fast recovery of the primary radio link failure depends on at least one of: whether the SRB3 at the SN/SCG side has a capability of supporting fast recovery of the primary radio link failure; and whether the SRB3 at the SN/SCG side is in a state of supporting fast recovery of the primary radio link failure. However, in the related art, the MN/MCG does not have knowledge of the information, so that an erroneous configuration may occur, thereby resulting in a low success rate of fast recovery of the primary radio link failure.

Figure 4:
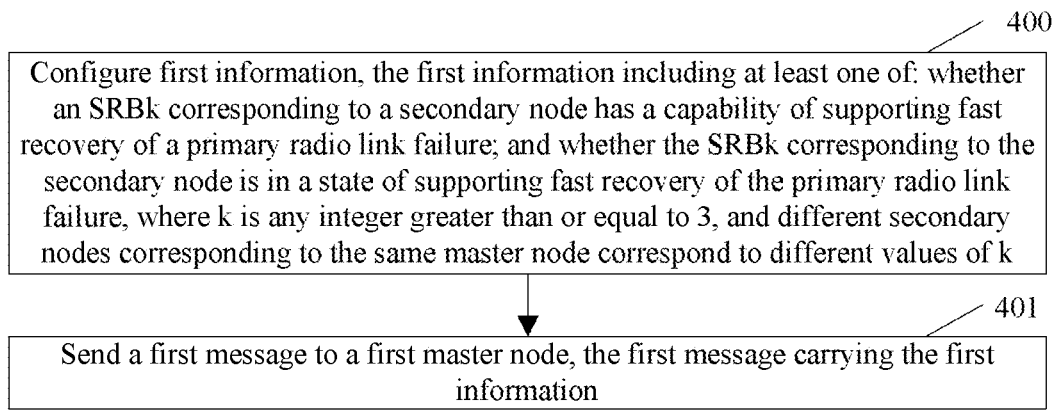
FIG. 4 is a flowchart of an information synchronization method according to the embodiments of the present disclosure.

FIG. 4 is a flowchart of an information synchronization method according to the embodiments of the present disclosure.

In a first aspect, referring to FIG. 4, the embodiments of the present disclosure provide an information synchronization method applied to a secondary node (namely, an SN, or an SgNB, or an S-node, or an SeNB). The method includes operations 400 and 401.

At 400, first information is configured, wherein the first information includes at least one of: whether an SRBk corresponding to the secondary node has a capability of supporting fast recovery of a primary radio link failure; and whether the SRBk corresponding to the secondary node is in a state of supporting fast recovery of the primary radio link failure, k is any integer greater than or equal to 3, and different secondary nodes corresponding to the same master node correspond to different values of k.

In some embodiments, fast recovery of the primary radio link failure refers to fast recovery of the primary radio link when encountering the primary radio link failure, or in other words, the primary radio link is recovered quickly when encountering a failure of the primary radio link.

In some embodiments, the first information includes only whether the SRBk corresponding to the secondary node has a capability of supporting fast recovery of the primary radio link failure. In an exemplary implementation, whether the SRBk corresponding to the secondary node has the capability of supporting fast recovery of the primary radio link failure refers to whether the SRBk corresponding to the secondary node is able to support fast recovery of the primary radio link failure, and may be represented by two values respectively indicating having the capability and not having the capability. In this case, when the SRBk has the capability of supporting fast recovery of the primary radio link failure, the SRBk is deemed to be in the state of supporting fast recovery of the primary radio link failure by default.

It should be noted that configuring the SRBk to have the capability of supporting fast recovery of the primary radio link failure may also be referred to as enabling or activating or configuring the capability of the SRBk in terms of supporting fast recovery of the primary radio link failure, and configuring to SRBk to not have the capability of supporting fast recovery of the primary radio link failure may also be referred to as disabling or de-activating or de-configuring the capability of the SRBk in terms of supporting fast recovery of the primary radio link failure.

In other embodiments, the first information only includes whether the SRBk corresponding to the secondary node is in a state of supporting fast recovery of the primary radio link failure. In an exemplary implementation, whether the SRBk corresponding to the secondary node is in the state of supporting fast recovery of the primary radio link failure refers to whether the SRBk corresponding to the secondary node is currently in a state of supporting fast recovery of the primary radio link failure, and may be represented by two values respectively indicating currently being in the state of supporting fast recovery of the primary radio link failure and currently being in the state of not supporting fast recovery of the primary radio link failure. In this case, the SRBk is deemed to have the capability of supporting fast recovery of the primary radio link failure by default.

It should be noted that configuring the SRBk to be in the state of supporting fast recovery of the primary radio link failure may also be referred to as enabling or activating or configuring the state of the SRBk in terms of supporting fast recovery of the primary radio link failure, and configuring the SRBk to be in the state of not supporting fast recovery of the primary radio link failure may also be referred to as disabling or de-activating or de-configuring the state of the SRBk in terms of supporting fast recovery of the primary radio link failure.

In other embodiments, the first information includes whether the SRBk corresponding to the secondary node has a capability of supporting fast recovery of the primary radio link failure and whether the SRBk corresponding to the secondary node is in a state of supporting fast recovery of the primary radio link failure, and may be represented by three combination values respectively indicating: having the capability of supporting fast recovery of the primary radio link failure and being in the state of supporting fast recovery of the primary radio link failure, having the capability of supporting fast recovery of the primary radio link failure but being in the state of not supporting fast recovery of the primary radio link failure, and not having the capability of supporting fast recovery of the primary radio link failure. In some embodiments, the capability and the state are sent separately; while in other embodiments, the capability and the state are sent simultaneously.

In some embodiments, the first information may be configured according to a local condition, and the local condition may be, for example, a local wireless condition. For example, when the local wireless condition is relatively good, the first information may be configured to indicate that the SRBk corresponding to the secondary node has the capability of supporting fast recovery of the primary radio link failure; or the SRBk corresponding to the secondary node is currently in the state of supporting fast recovery of the primary radio link failure; or the SRBk corresponding to the secondary node has the capability of supporting fast recovery of the primary radio link failure, and is currently in the state of supporting fast recovery of the primary radio link failure. For example, when the local radio condition is relatively poor, the first information may be configured to indicate that the SRBk corresponding to the secondary node does not have the capability of supporting fast recovery of the primary radio link failure; or the SRBk corresponding to the secondary node is currently in the state of not supporting fast recovery of the primary radio link failure. The specific information based on which the first information is configured, and specifically how to configure the first information according to the relevant information are not used to limit the scope of protection of the embodiments of the present disclosure.

At 401, a first message is sent to a first master node, wherein the first message carries the first information.

The value of the first information carried in the first message in operation 401 is the same as the value of the first information configured in operation 400.

The embodiments of the present disclosure achieve the synchronization, from the secondary node to the first master node, of at least one of the following information: whether the SRBk has the capability of supporting fast recovery of the primary radio link failure; and whether SRBk is in the state of supporting fast recovery of the primary radio link failure, so that the first master node can acquire the above information, and thus the first master node can configure the UE according to the above information, thereby improving the success rate of fast recovery of the primary radio link failure.

In other embodiments, the method further includes the following operation.

A second message returned by the first master node is received, wherein the second message carries second information, and the second information includes information indicating whether the first master node enables or configures or activates the UE to perform fast recovery of the primary radio link failure via the SRBk.

In an exemplary implementation, in a case where the first information is that the SRBk corresponding to the secondary node has the capability of supporting fast recovery of the primary radio link failure, or the SRBk corresponding to the secondary node is currently in the state of supporting fast recovery of the primary radio link failure, or the SRBk corresponding to the secondary node has the capability of supporting fast recovery of the primary radio link failure and is currently in the state of supporting fast recovery of the primary radio link failure, the second information carried in the second message is information indicating that the first master node enables or configures or activates the UE to perform fast recovery of the radio link failure via the SRBk.

In a case where the first information is that the SRBk corresponding to the secondary node does not have the capability of supporting fast recovery of the primary radio link failure, or the SRBk corresponding to the secondary node is currently in the state of not supporting fast recovery of the primary radio link failure, the second information carried in the second message is information indicating that the first master node disables or de-configures or de-activates the UE from performing fast recovery of the primary radio link failure via the SRBk.

It should be noted that, the information indicating that the first master node enables or configures or activates the UE to perform fast recovery of the radio link failure via the SRBk may also be referred to as information indicating that the first master node configures the UE to perform fast recovery of the radio link failure via the SRBk; and information indicating that the first master node disables or de-configures or de-activates the UE from performing fast recovery of the primary radio link failure via the SRBk may also be referred to as information indicating that the first master node configures the UE not to perform fast recovery of the primary radio link failure via the SRBk.

In some embodiments, the first message is an SN modification request message, and the second message is an SN modification acknowledgement message. In some embodiments, the SN modification request message may also be referred to as an SgNB modification request message, or an SeNB modification request message, or an S-node modification request message; and the SN modification acknowledgement message may also be referred to as an SgNB modification acknowledgement message, an SeNB modification acknowledgement message, or an S-node modification acknowledgement message.

In other embodiments, the first message is an SN state indication message. In some embodiments, the SN state indication message may be referred to as an SeNB state indication message, or an SgNB state indication message, or an S-node state indication message.

In other embodiments, the method further includes the following operations.

A third message sent by the first master node is received, and the third message is sent to UE, wherein the third message carries at least one SRBk selected by the first master node and third information, and the third information includes information indicating whether the first master node enables or configures or activates the UE to perform fast recovery of the primary radio link failure. A fourth message is received from the UE, and the fourth message is sent to the first master node.

In some embodiments, the third message does not carry a priority of each of the at least one selected SRBk for subsequent fast recovery of the primary radio link failure, and the priority is determined according to an order of the at least one selected SRBk carried in the third message. For example, the priority of the SRBk located in a front position is higher than the priority of the SRBk located in a rear position, or the priority of the SRBk located in a front position is lower than the priority of the SRBk located in a rear position. Of course, other manners may also be adopted for determining the priority of each of the at least one selected SRBk, and the specific manner is not intended to limit the scope of protection of the embodiments of the present disclosure.

In other embodiments, the third message further carries a priority of each of the at least one selected SRBk for subsequent fast recovery of the primary radio link failure.

In other embodiments, the third message is an RRC reconfiguration message, and the fourth message is an RRC reconfiguration complete message.

Figure 5:
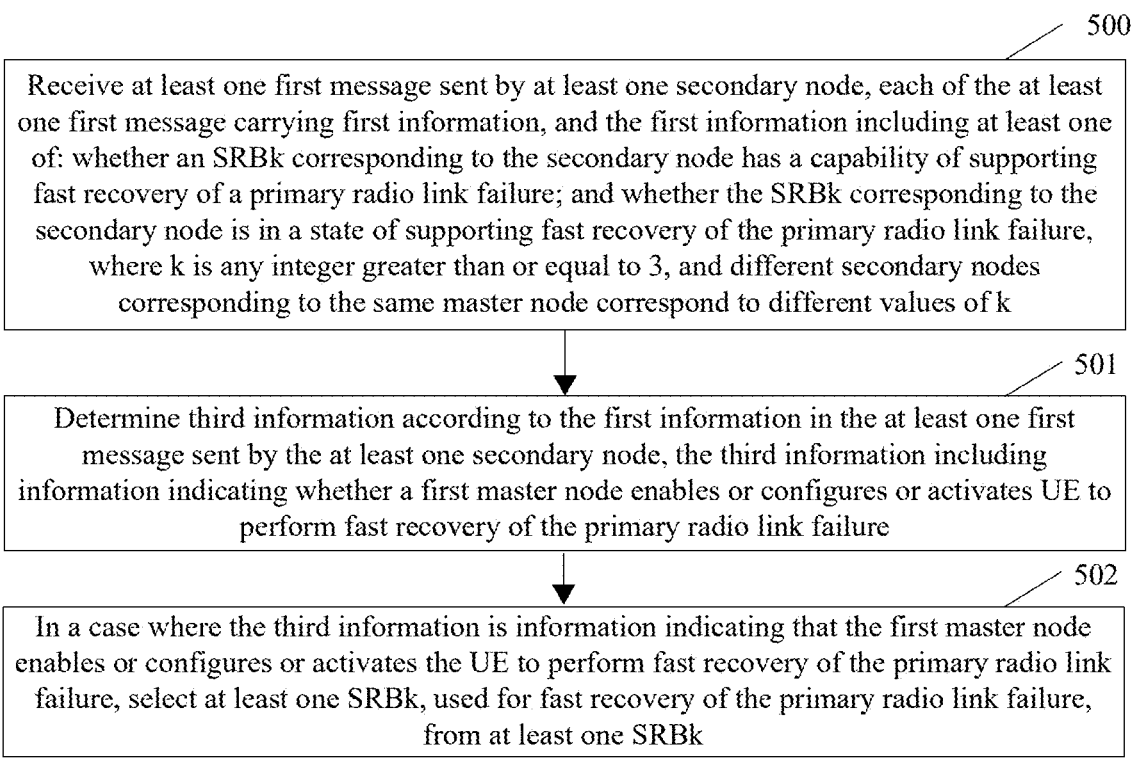
FIG. 5 is a flowchart of another information synchronization method according to the embodiments of the present disclosure.

FIG. 5 is a flowchart of another information synchronization method according to the embodiments of the present disclosure.

In a second aspect, referring to FIG. 5, the embodiments of the present disclosure provide another information synchronization method applied to a first master node (which may also be referred to as a source master node in some embodiments, i.e., an MN, an MeNB, an MgNB, or an M node). The method includes operations 500 to 502.

At 500, at least one first message sent by at least one secondary node is received, wherein each of the at least one first message carries first information, and the first information includes at least one of: whether an SRBk corresponding to the secondary node has a capability of supporting fast recovery of a primary radio link failure; and whether the SRBk corresponding to the secondary node is in a state of supporting fast recovery of the primary radio link failure, wherein k is any integer greater than or equal to 3, and different secondary nodes corresponding to the same master node correspond to different values of k.

In some embodiments, the first information includes only whether the SRBk corresponding to the secondary node has the capability of supporting fast recovery of the primary radio link failure. In an exemplary implementation, whether the SRBk corresponding to the secondary node has the capability of supporting fast recovery of the primary radio link failure refers to whether the SRBk corresponding to the secondary node is able to support fast recovery of the primary radio link failure, and may be represented by two values respectively indicating having the capability and not having the capability. In this case, when the SRBk has the capability of supporting fast recovery of the primary radio link failure, the SRBk is deemed to be in the state of supporting fast recovery of the primary radio link failure by default.

It should be noted that configuring the SRBk to have the capability of supporting fast recovery of the primary radio link failure may also be referred to as enabling or activating or configuring the capability of the SRBk in terms of supporting fast recovery of the primary radio link failure, and configuring to SRBk to not have the capability of supporting fast recovery of the primary radio link failure may also be referred to as disabling or de-activating or de-configuring the capability of the SRBk in terms of supporting fast recovery of the primary radio link failure.

In other embodiments, the first information only includes whether the SRBk corresponding to the secondary node is in a state of supporting fast recovery of the primary radio link failure. In an exemplary implementation, whether the SRBk corresponding to the secondary node is in the state of supporting fast recovery of the primary radio link failure refers to whether the SRBk corresponding to the secondary node is currently in a state of supporting fast recovery of the primary radio link failure, and may be represented by two values respectively indicating currently being in the state of supporting fast recovery of the primary radio link failure and currently being in the state of not supporting fast recovery of the primary radio link failure. In this case, the SRBk is deemed to have the capability of supporting fast recovery of the primary radio link failure by default.

It should be noted that configuring the SRBk to be in the state of supporting fast recovery of the primary radio link failure may also be referred to as enabling or activating or configuring the state of the SRBk in terms of supporting fast recovery of the primary radio link failure, and configuring the SRBk to be in the state of not supporting fast recovery of the primary radio link failure may also be referred to as disabling or de-activating or de-configuring the state of the SRBk in terms of supporting fast recovery of the primary radio link failure.

In other embodiments, the first information includes whether the SRBk corresponding to the secondary node has a capability of supporting fast recovery of the primary radio link failure and whether the SRBk corresponding to the secondary node is in a state of supporting fast recovery of the primary radio link failure, and may be represented by three combination values: having the capability of supporting fast recovery of the primary radio link failure and being in the state of supporting fast recovery of the primary radio link failure, having the capability of supporting fast recovery of the primary radio link failure but being in the state of not supporting fast recovery of the primary radio link failure, and not having the capability of supporting fast recovery of the primary radio link failure. In some embodiments, the capability and the state are sent separately; while in other embodiments, the capability and the state are sent simultaneously.

At 501, third information is determined according to the first information in the at least one first message sent by at least one secondary node, wherein the third information includes information indicating whether the first master node enables or configures or activates UE to perform fast recovery of the primary radio link failure.

In some embodiments, in a case where the first information in the first message sent by the at least one secondary node indicates having the capability of supporting fast recovery of the primary radio link failure, or currently being in the state of supporting fast recovery of the primary radio link failure, or having the capability of supporting fast recovery of the primary radio link failure and currently being in the state of supporting fast recovery of the primary radio link failure, the third information is determined to be information indicating that the first master node enables or configures or activates the UE to perform fast recovery of the primary radio link failure.

In a case where each pieces of the first information in the first messages sent by all the secondary nodes indicates not having the capability of supporting fast recovery of the primary radio link failure, or currently being in the state of not supporting fast recovery of the primary radio link failure, or having the capability of supporting fast recovery of the primary radio link failure but currently being in the state of not supporting fast recovery of the primary radio link failure, the third information is determined to be information indicating that the first master node disables or de-configures or de-activates the UE to perform fast recovery of the primary radio link failure.

At 502, in a case where the third information is information indicating that the first master node enables or configures or activates the UE to perform fast recovery of the primary radio link failure, at least one SRBk is selected, from at least one SRBk, for fast recovery of the primary radio link failure.

In a case where the first information only includes whether the SRBk corresponding to the secondary node has the capability of supporting fast recovery of the primary radio link failure, in some embodiments, at least one SRBk having the capability of supporting fast recovery of the primary radio link failure is selected, from the at least one SRBk, for performing the fast recovery of the primary radio link failure for the UE; and in other embodiments, at least one SRBk may also be selected in other manners for performing fast recovery of the primary radio link failure for the UE, and the specific selection manner is not intended to limit the scope of protection of the embodiments of the present disclosure.

In a case where the first information only includes whether the SRBk corresponding to the secondary node is in the state of supporting fast recovery of the primary radio link failure, in some embodiments, at least one SRBk currently being in the state of supporting fast recovery of the primary radio link failure is selected, from the at least one SRBk, for performing the fast recovery of the primary radio link failure for the UE; and in other embodiments, at least one SRBk may also be selected in other manners for performing fast recovery of the primary radio link failure for the UE, and the specific selection manner is not intended to limit the scope of protection of the embodiments of the present disclosure.

In a case where the first information includes whether the SRBk corresponding to the secondary node has the capability of supporting fast recovery of the primary radio link failure and whether the SRBk corresponding to the secondary node is in the state of supporting fast recovery of the primary radio link failure, in some embodiments, at least one SRBk having the capability of supporting fast recovery of the primary radio link failure and currently being in the state of supporting fast recovery of the primary radio link failure is selected, from the at least one SRBk, for performing the fast recovery of the primary radio link failure for the UE; and in other embodiments, at least one SRBk may also be selected in other manners for performing fast recovery of the primary radio link failure for the UE, and the specific selection manner is not intended to limit the scope of protection of the embodiments of the present disclosure.

In other embodiments, in a case where the third information indicates that the first master node disables or de-configures or de-activates the UE from performing fast recovery of the primary radio link failure, the operation of selecting is not required to be performed.

In other embodiments, the method further includes the following operation.

A second message is respectively returned to the secondary node corresponding to each of the at least one SRBk, wherein the second message carries second information.

The second information in the second message returned to the secondary node corresponding to each selected SRBk is information indicating that the first master node enables or configures or activates the UE to perform fast recovery of the primary radio link failure via the SRBk.

The second information in the second message returned to the secondary node corresponding to each non-selected SRBk is information indicating that the first master node disables or de-configures or de-activates the UE from performing fast recovery of the primary radio link failure via the SRBk.

In some embodiments, the first message is an SN modification request message, and the second message is an SN modification acknowledgement message. In some embodiments, the SN modification request message may also be referred to as an SgNB modification request message, or an SeNB modification request message, or an S-node modification request message; and the SN modification acknowledgement message may also be referred to as an SgNB modification acknowledgement message, an SeNB modification acknowledgement message, or an S-node modification acknowledgement message.

In other embodiments, the first message is an SN state indication message. In some embodiments, the SN state indication message may be referred to as an SeNB state indication message, or an SgNB state indication message, or an S-node state indication message.

In other embodiments, the method further includes the following operations.

A third message is sent to the UE or the at least one secondary node according to the at least one selected SRBk, wherein the third message carries the at least one SRBk selected by the first master node and the third information.

A fourth message sent by the UE or the at least one secondary node is received.

In other embodiments, the third message further carries a priority of each of the at least one selected SRBk for subsequent fast recovery of the primary radio link failure.

In other embodiments, the third message is an RRC reconfiguration message, and the fourth message is an RRC reconfiguration complete message.

In other embodiments, the method further includes the following operation.

A fifth message is sent to a second master node (which may also be referred to as a target master node in some embodiments), wherein the fifth message carries first information corresponding to each of the at least one secondary node.

In other embodiments, the fifth message is a handover request message.

Figure 6:
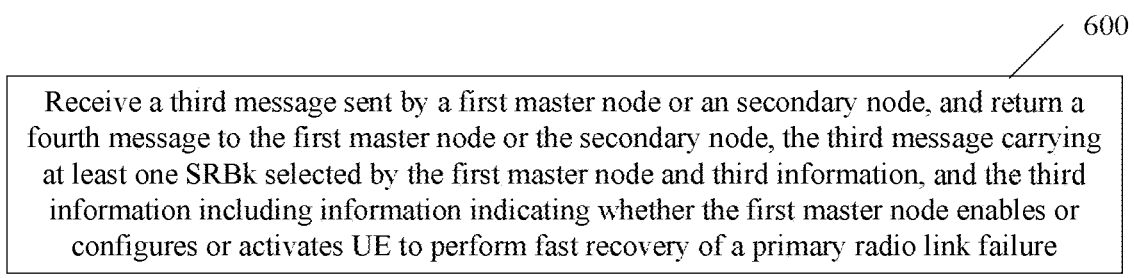
FIG. 6 is a flowchart of another information synchronization method according to the embodiments of the present disclosure.

FIG. 6 is a flowchart of another information synchronization method according to the embodiments of the present disclosure.

In a third aspect, referring to FIG. 6, the embodiments of the present disclosure provide another information synchronization method applied to UE, and the method includes operation 600.

At 600, a third message sent by a first master node or a secondary node is received, and a fourth message is returned to the first master node or the secondary node, wherein the third message carries at least one SRBk selected by the first master node and third information, and the third information includes information indicating whether the first master node enables or configures or activates the UE to perform fast recovery of a primary radio link failure.

In some embodiments, the third message does not carry a priority of each of the at least one selected SRBk for subsequent fast recovery of the primary radio link failure, and the priority is determined according to an order of the at least one selected SRBk carried in the third message. For example, the priority of the SRBk located in a front position is higher than the priority of the SRBk located in a rear position, or the priority of the SRBk located in a front position is lower than the priority of the SRBk located in a rear position. Of course, other manners may also be adopted for determining the priority, and the specific manner is not intended to limit the scope of protection of the embodiments of the present disclosure.

In some embodiments, the third message further carries a priority of each of the at least one selected SRBk for subsequent fast recovery of the primary radio link failure.

In some embodiments, the third message is an RRC reconfiguration message, and the fourth message is an RRC reconfiguration complete message.

In other embodiments, fast recovery of the primary radio link failure may be performed via the at least one SRBk in a descending order of the priority of each of the at least one SRBk. For example, fast recovery of the primary radio link failure is performed via the SRBk with the highest priority, and in a case where fast recovery of the primary radio link failure cannot be completed via the SRBk with the highest priority, fast recovery of the primary radio link failure is performed via the SRBk with the second highest priority, and so on.

FIG. 7 is a flowchart of another information synchronization method according to the embodiments of the present disclosure.

In a fourth aspect, referring to FIG. 7, the embodiments of the present disclosure provide another information synchronization method applied to a second master node (also referred to as a target master node in some embodiments), and the method includes operation 700.

At 700, a fifth message sent by a first master node is received, wherein the fifth message carries first information corresponding to each of at least one secondary node corresponding to the first master node, and the first information includes at least one of: whether an SRBk corresponding to the secondary node has a capability of supporting fast recovery of a primary radio link failure; and whether the SRBk corresponding to the secondary node is in a state of supporting fast recovery of the primary radio link failure, wherein k is any integer greater than or equal to 3, and different secondary nodes corresponding to the same master node correspond to different values of k.

In some embodiments, the fifth message is a handover request message.

In some embodiments, the first information includes only whether the SRBk corresponding to the secondary node has the capability of supporting fast recovery of the primary radio link failure. In an exemplary implementation, whether the SRBk corresponding to the secondary node has the capability of supporting fast recovery of the primary radio link failure refers to whether the SRBk corresponding to the secondary node is able to support fast recovery of the primary radio link failure, and may be represented by two values respectively indicating having the capability and not having the capability. In this case, when the SRBk has the capability of supporting fast recovery of the primary radio link failure, the SRBk is deemed to be in the state of supporting fast recovery of the primary radio link failure by default.

It should be noted that configuring the SRBk to have the capability of supporting fast recovery of the primary radio link failure may also be referred to as enabling or activating or configuring the capability of the SRBk in terms of supporting fast recovery of the primary radio link failure, and configuring to SRBk to not have the capability of supporting fast recovery of the primary radio link failure may also be referred to as disabling or de-activating or de-configuring the capability of the SRBk in terms of supporting fast recovery of the primary radio link failure.

In other embodiments, the first information only includes whether the SRBk corresponding to the secondary node is in the state of supporting fast recovery of the primary radio link failure. In an exemplary implementation, whether the SRBk corresponding to the secondary node is in the state of supporting fast recovery of the primary radio link failure refers to whether the SRBk corresponding to the secondary node is currently in a state of supporting fast recovery of the primary radio link failure, and may be represented by two values respectively indicating currently being in the state of supporting fast recovery of the primary radio link failure and currently being in the state of not supporting fast recovery of the primary radio link failure. In this case, the SRBk is deemed to have the capability of supporting fast recovery of the primary radio link failure by default.

It should be noted that configuring the SRBk to be in the state of supporting fast recovery of the primary radio link failure may also be referred to as enabling or activating or configuring the state of the SRBk in terms of supporting fast recovery of the primary radio link failure, and configuring the SRBk to be in the state of not supporting fast recovery of the primary radio link failure may also be referred to as disabling or de-activating or de-configuring the state of the SRBk in terms of supporting fast recovery of the primary radio link failure.

In other embodiments, the first information includes whether the SRBk corresponding to the secondary node has the capability of supporting fast recovery of the primary radio link failure and whether the SRBk corresponding to the secondary node is in the state of supporting fast recovery of the primary radio link failure, and may be represented by three combination values: having the capability of supporting fast recovery of the primary radio link failure and being in the state of supporting fast recovery of the primary radio link failure, having the capability of supporting fast recovery of the primary radio link failure but being in the state of not supporting fast recovery of the primary radio link failure, and not having the capability of supporting fast recovery of the primary radio link failure. In some embodiments, the capability and the state are sent separately; while in other embodiments, the capability and the state are sent simultaneously.

The implementation process of the information synchronization method of the embodiments of the present disclosure will be described in detail below by way of several specific examples. The listed examples are only for the convenience of description, and cannot be considered that the implementation of the embodiments of the present disclosure is limited to the implementation in the listed examples. The listed examples are not intended to limit the scope of protection of the embodiments of the present disclosure.

Example 1

As shown in FIG. 8, UE is configured with a MeNB+SgNB E-UTRA-NR Dual-Connectivity (EN-DC) operation, and the UE is connected to both MeNB and SgNB or is served by both MeNB and SgNB.

At 800, at first the SgNB does not configure whether the SRB3 has a capability of supporting fast recovery of the primary radio link failure, and therefore the MeNB does not configure or activate the UE to perform fast recovery of the primary radio link failure via the SRB3.

At 801, after a period of time, the SgNB locally configures that the SRB3 has the capability of supporting fast recovery of the primary radio link failure according to a local condition, and sends an SgNB modification request message of an X2AP procedure to the MeNB, wherein the SgNB modification request message carries information indicating that the SRB3 the capability of supporting fast recovery of the primary radio link failure, for example, "fast MCG recovery=true" is indicated in the SgNB modification request message.

At 802, when receiving the above indication, the MeNB returns an SgNB modification acknowledgement message of the X2AP procedure to the SgNB, wherein the SgNB modification acknowledgement message carries information indicating that the MeNB enables the UE to perform fast recovery of the primary radio link failure via the SRB3, for example, "fast MCG recovery=enable" is indicated in the SgNB modification acknowledgement message.

At 803, the MeNB sends an RRC reconfiguration message to the UE, wherein the RRC reconfiguration message carries the SRB3 and information indicating that the MeNB enables the UE to perform fast recovery of the primary radio link failure via the SRB3.

At 804, the UE returns an RRC reconfiguration complete message to the MeNB.

At 805, after a period of time, due to the influence of a local condition, the SgNB locally configures that SRB3 does not have the capability of supporting fast recovery of the primary radio link failure, and sends an SgNB modification request message of the X2AP procedure to the MeNB, wherein the SgNB modification request message carries information indicating that the SRB3 does not have the capability of supporting fast recovery of the primary radio link failure, for example, "fast MCG recovery=false" is indicated in the SgNB modification request message.

At 806, after the MeNB receives the above indication, the MeNB returns an SgNB modification acknowledgement message of the X2AP procedure to the SgNB, wherein the SgNB modification acknowledgement message carries information indicating that the MeNB disables the UE from performing fast recovery of the primary radio link failure via the SRB3, for example, "fast MCG recovery=disable" is indicated in the SgNB modification acknowledgement message.

At 807, the MeNB sends an RRC reconfiguration message to the UE, wherein the RRC reconfiguration message carries the SRB3 and information indicating that the MeNB disables the UE from performing fast recovery of the primary radio link failure via the SRB3.

At 808, the UE returns an RRC reconfiguration complete message to the MeNB.

Example 2

Figure 9:
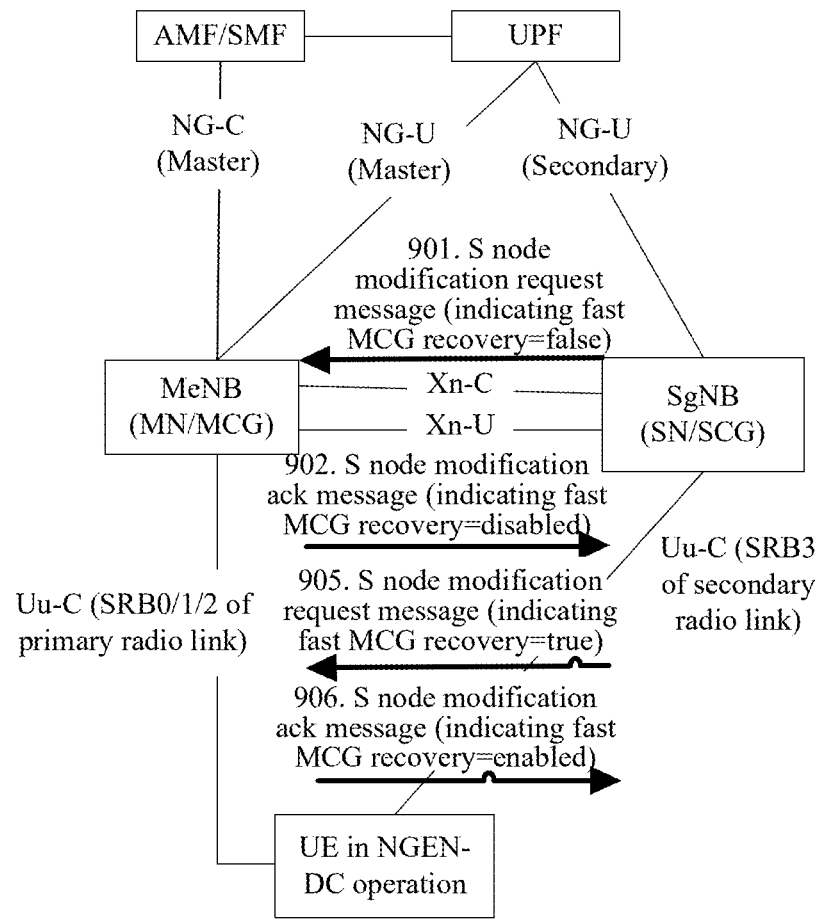
FIG. 9 is a flowchart of an information synchronization method according to Example 2 of the embodiments of the present disclosure.

As shown in FIG. 9, UE is configured with an MeNB+SgNB NG E-UTRA-NR Dual-Connectivity (NGEN-DC) operation, and the UE is connected to both MeNB and SgNB or is served by both MeNB and SgNB.

At 900, at first the SgNB configures that an SRB3 is currently in a state of supporting fast recovery of a primary radio link failure, so that the MeNB configures or activates the UE to perform fast recovery of the primary radio link failure via the SRB3.

At 901, after a period of time, under the influence of a local condition, the SgNB locally configures that the SRB3 is currently in a state of not supporting fast recovery of the primary radio link failure, and sends an S-node modification request message of an XnAP procedure to the MeNB, wherein the S-node modification request message carries that the SRB3 is currently in the state of not supporting fast recovery of the primary radio link failure, for example, "fast MCG recovery=false" is indicated in the S-node modification request message.

At 902, when receiving the above indication, the MeNB returns an S-node modification acknowledgement message of the XnAP procedure to the SgNB, wherein the S-node modification acknowledgement message carries information indicating that the MeNB disables the UE from performing fast recovery of the primary radio link failure via the SRB3, for example, "fast MCG recovery=disable" is indicated in the SgNB modification acknowledgement message.

At 903, the MeNB sends an RRC reconfiguration message to the UE, wherein the RRC reconfiguration message carries the SRB3 and information indicating that the MeNB disables the UE from performing fast recovery of the primary radio link failure via the SRB3.

At 904, the UE returns an RRC reconfiguration complete message to the MeNB.

At 905, after a period of time, under the influence of a local condition, the SgNB locally configures that the SRB3 is currently in a state of supporting fast recovery of the primary radio link failure, and sends an S-node modification request message of the XnAP procedure to the MeNB, wherein the S-node modification request message carries that the SRB3 is currently in the state of supporting fast recovery of the primary radio link failure, for example, "fast MCG recovery=true" is indicated in the S-node modification request message.

At 906, after the MeNB receives the above indication, the MeNB returns an S-node modification acknowledgement message of the XnAP procedure to the SeNB, wherein the S-node modification acknowledgement message carries information indicating that the MeNB enables the UE to perform fast recovery of the primary radio link failure via the SRB3, for example, "fast MCG recovery=enable" is indicated in the S-node modification acknowledgement message.

At 907, the MeNB sends an RRC reconfiguration message to the UE, wherein the RRC reconfiguration message carries the SRB3 and information indicating that the MeNB enables the UE to perform fast recovery of the primary radio link failure via the SRB3.

At 908, the UE returns an RRC reconfiguration complete message to the MeNB.

Example 3

Figure 10:
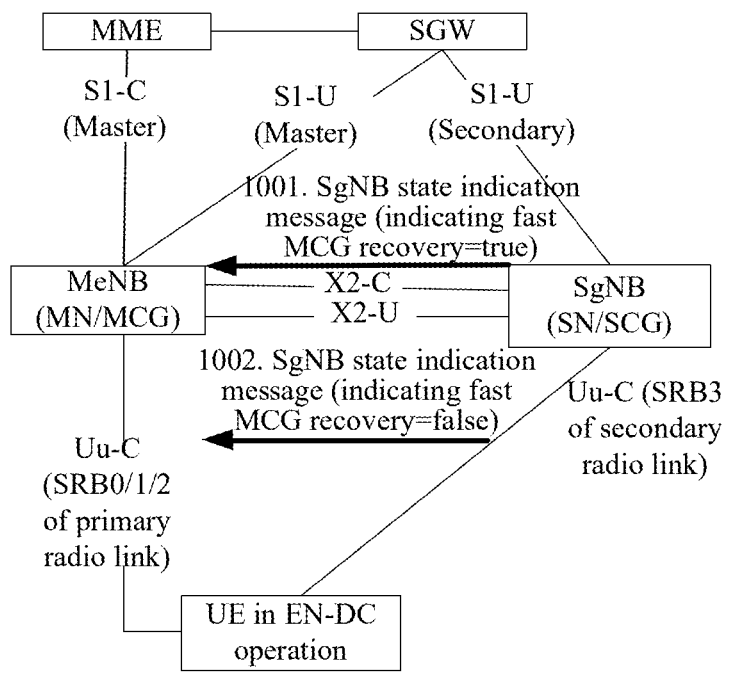
FIG. 10 is a flowchart of an information synchronization method according to Example 3 of the embodiments of the present disclosure.

As shown in FIG. 10, a UE is configured with an MeNB+SgNB NG E-UTRA Dual-Connectivity (NE-DC) operation, wherein the UE is connected to both MeNB and SgNB, or is served by both MeNB and SgNB.

At 1000, at first the SgNB does not configure whether the SRB3 has a capability of supporting fast recovery of the primary radio link failure, and therefore the MeNB does not configure or activate the UE to perform fast recovery of the primary radio link failure via the SRB3.

At 1001, after a period of time, the SgNB locally configures that SRB3 has a capability of supporting fast recovery of the primary radio link failure according to a local condition, and sends an SgNB state indication message of an X2AP procedure to the MeNB, wherein the SgNB state indication message carries information indicating that the SRB3 has the capability of supporting fast recovery of the primary radio link failure, for example, "fast MCG recovery=true" is indicated in the SgNB state indication message.

At 1002, when receiving the above indication, the MeNB does not return any message to the SgNB.

At 1003, the MeNB sends an RRC reconfiguration message to the UE, wherein the RRC reconfiguration message carries the SRB3 and information indicating that the MeNB enables the UE to perform fast recovery of the primary radio link failure via the SRB3.

At 1004, the UE returns an RRC reconfiguration complete message to the MeNB.

At 1005, after a period of time, due to the influence of a local condition, the SgNB locally configures that the SRB3 does not have the capability of supporting fast recovery of the primary radio link failure, and sends an SgNB state indication message of the X2AP procedure to the MeNB, wherein the SgNB state indication message carries information indicating that the SRB3 does not have the capability of supporting fast recovery of the primary radio link failure, for example, "fast MCG recovery=false" is indicated in the SgNB state indication message.

At 1006, when receiving the above indication, the MeNB does not return any message to the SgNB.

At 1007, the MeNB sends an RRC reconfiguration message to the UE, wherein the RRC reconfiguration message carries the SRB3 and information indicating that the MENB disables the UE from performing fast recovery of the primary radio link failure via the SRB3.

At 1008, the UE returns an RRC reconfiguration complete message to the MeNB.

Example 4

Figure 11:
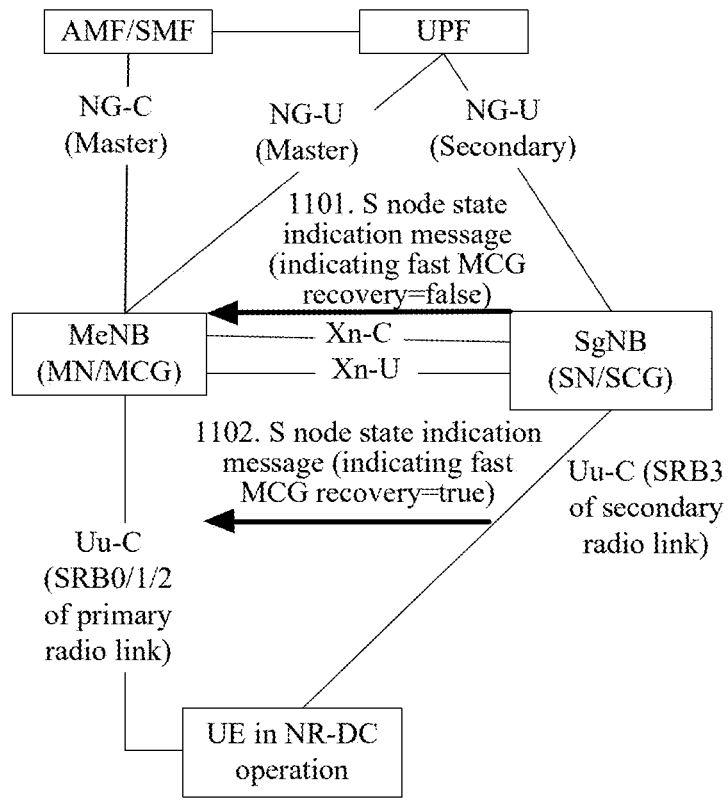
FIG. 11 is a flowchart of an information synchronization method according to Example 4 of the embodiments of the present disclosure.

As shown in FIG. 11, UE is configured with an NR-DC operation, and the UE is connected to both MeNB and SgNB or is served by both MeNB and SgNB.

At 1100, at first the SgNB configures that an SRB3 is currently in a state of supporting fast recovery of the primary radio link failure, and therefore the MeNB configures or activates the UE to perform fast recovery of the primary radio link failure via the SRB3.

At 1101, after a period of time, under the influence of a local condition, the SgNB locally configures that the SRB3 is currently in a state of not supporting fast recovery of the primary radio link failure, and sends an S-node state indication message of an XnAP procedure to the MeNB, wherein the S-node state indication message carries information indicating that the SRB3 is currently in a state of not supporting fast recovery of the primary radio link failure, for example, "fast MCG recovery=false" is indicated in the S-node state indication message.

At 1102, when receiving the above indication, the MeNB does not return any message to the SgNB.

At 1103, the MeNB sends an RRC reconfiguration message to the UE, wherein the RRC reconfiguration message carries the SRB3 and information indicating that the MeNB disables the UE from performing fast recovery of the primary radio link failure via the SRB3.

At 1104, the UE returns an RRC reconfiguration complete message to the MeNB.

At 1105, after a period of time, under the influence of a local condition, the SgNB locally configures that the SRB3 is currently in a state of supporting fast recovery of the primary radio link failure, and sends an S-node state indication message of the XnAP procedure to the MeNB, wherein the S-node state indication message carries information indicating that the SRB3 is currently in the state of supporting fast recovery of the primary radio link failure, for example, "fast MCG recovery=true" is indicated in the S-node state indication message.

At 1106, after the MeNB receives the above indication, the MeNB does not return any message to the SgNB.

At 1107, the MeNB sends an RRC reconfiguration message to the UE, wherein the RRC reconfiguration message carries the SRB3 and information indicating that the MeNB enables the UE to perform fast recovery of the primary radio link failure via the SRB3.

At 1108, the UE returns an RRC reconfiguration complete message to the MeNB.

Example 5

Figure 12:
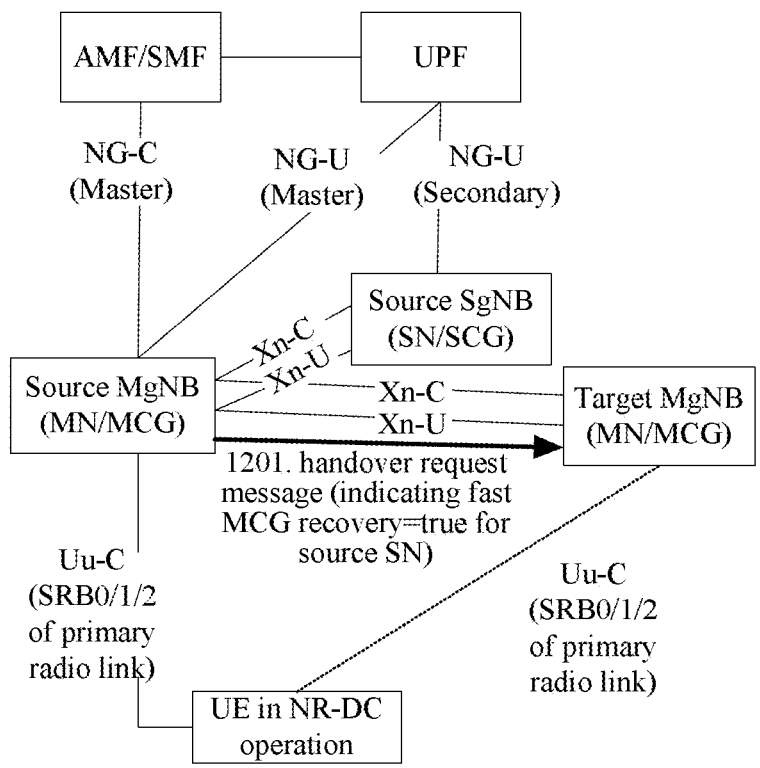
FIG. 12 is a flowchart of an information synchronization method according to Example 5 of the embodiments of the present disclosure.

As shown in FIG. 12, UE is configured with an NR-DC operation, and the UE is connected to both MeNB and SgNB or is served by both MeNB and SgNB.

At 1200, at first a source SgNB configures that an SRB3 is currently in a state of supporting fast recovery of a primary radio link failure, so that a source MeNB configures or activates the UE to perform fast recovery of the primary radio link failure via the SRB3.

At 1201, after a period of time, the source MgNB prepares to perform an Xn handover to a specific target MgNB, and sends a handover request message of an XnAP procedure to the target MgNB, wherein the handover request message includes information indicating that the SRB3 of the source SgNB corresponding to the source MgNB is currently in the state of supporting fast recovery of the primary radio link failure, for example, "fast MCG recovery of the source SN=true" is indicated in the handover request message.

In this operation, information indicating that the SRB3 is currently in the state of supporting fast recovery of the primary radio link failure is included in the handover request message as a part of the UE context at the SN side.

At 1202, the target MgNB determines a target SN according to the fact that the SRB3 of the source SgNB is currently in the state of supporting fast recovery of the primary radio link failure.

Example 6

Figure 13:
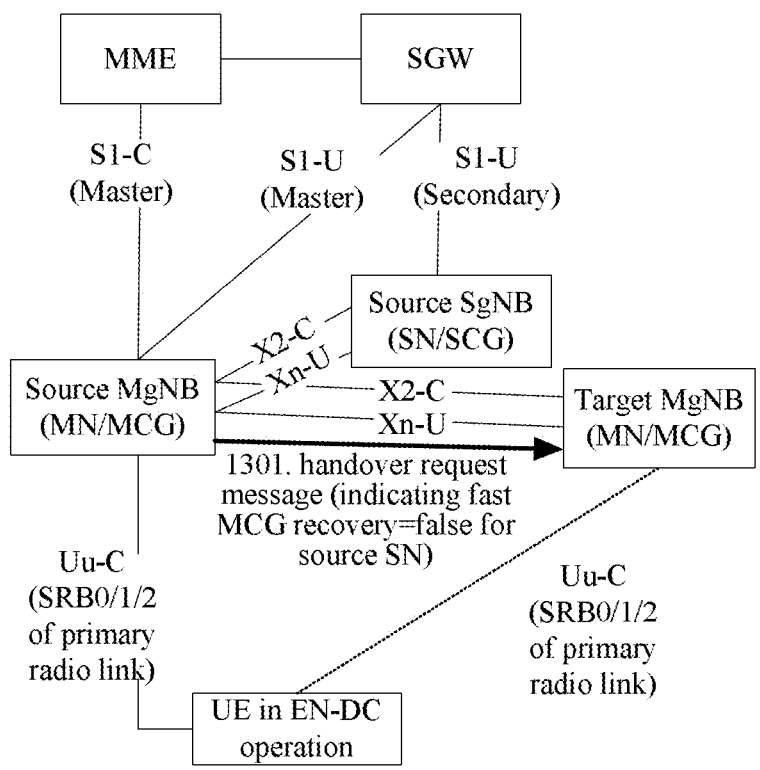
FIG. 13 is a flowchart of an information synchronization method according to Example 6 of the embodiments of the present disclosure.

As shown in FIG. 13, UE is configured with an EN-DC operation, and the UE is connected to both MeNB and SgNB or is served by both MeNB and SgNB.

At 1300, at first the source eNB configures that an SRB3 is currently in a state of not supporting fast recovery of a primary radio link failure, and therefore the source MeNB de-configures or de-activates the UE from performing fast recovery of the primary radio link failure via the SRB3.

At 1301, after a period of time, a source MgNB prepares to perform X2 handover to a specific target MgNB, and sends a handover request message of an X2AP procedure to the target MgNB, wherein the handover request message includes information indicating that the SRB3 of the source SgNB corresponding to the source MgNB is currently in a state of not supporting fast recovery of the primary radio link failure, for example, "fast MCG recovery of the source SN=false" is indicated in the handover request message.

In this operation, information indicating that the SRB3 is currently in the state of not supporting fast recovery of the primary radio link failure is included in the handover request message as a part of the UE context at the SN side.

At 1302, the target MgNB determines a target SN according to the fact that the SRB3 of the source SgNB is currently in the state of not supporting fast recovery of the primary radio link failure.

Example 7

As shown in FIG. 14, UE is configured with an MeNB+SgNB1+SgNB2 E-UTRA-NR Multi-Connectivity (EN-MC) operation, and the UE is connected to all of an MeNB, an SgNB1 and an SgNB2, or is served by all of the MeNB, the SgNB1 and the SgNB2.

At 1400, at first the SgNB1 does not configure whether an SRB3 has a capability of supporting fast recovery of the primary radio link failure, and the SgNB2 does not configure whether an SRB4 has a capability of supporting fast recovery of the primary radio link failure; therefore, the MeNB does not configure or de-activates the UE from performing fast recovery of the primary radio link failure via the SRB3 or the SRB4.

At 1401, after a period of time, according to a local condition, the SgNB1 locally configures that the SRB3 has the capability of supporting fast recovery of the primary radio link failure, and sends an SgNB modification request message of an X2AP procedure to the MeNB, wherein the SgNB modification request message carries information indicating that the SRB3 has the capability of supporting fast recovery of the primary radio link failure, for example, "fast MCG recovery=true" is indicated in the SgNB modification request message. The SgNB2 locally configures that the SRB4 has the capability of supporting fast recovery of the primary radio link failure, and sends an SgNB modification request message of an X2AP procedure to the MeNB, wherein the SgNB modification request message carries information indicating that the SRB4 has the capability of supporting fast recovery of the primary radio link failure, for example, "fast MCG recovery=true" is indicated in the SgNB modification request message.

At 1402, when receiving the above indication, the MeNB selects the SRB3 from the SRB3 and the SRB4 for performing fast recovery of the primary radio link failure for the UE. The MeNB returns an SgNB modification acknowledgement message of the X2AP procedure to the SgNB1, wherein the SgNB modification acknowledgement message carries information indicating that the MeNB enables the UE to perform fast recovery of the primary radio link failure via the SRB3, for example, "fast MCG recovery=enable" is indicated in the SgNB modification acknowledgement message. The MeNB also returns an SgNB modification acknowledgement message of the X2AP procedure to the SgNB2, wherein the SgNB modification acknowledgement message carries information indicating that the MeNB disables the UE from performing fast recovery of the primary radio link failure via the SRB4, for example, "fast MCG recovery=disable" is indicated in the SgNB modification acknowledgement message.

At 1403, the MeNB sends an RRC reconfiguration message to the UE, wherein the RRC reconfiguration message carries the SRB3 and information indicating that the MeNB enables or configures or activates the UE to perform fast recovery of the primary radio link failure.

At 1404, the UE returns an RRC reconfiguration completion message to the MeNB, and the UE may subsequently perform fast recovery of the primary radio link failure via the SRB3.

According to a fifth aspect, the embodiments of the present disclosure provide an electronic device, including:
at least one processor; and
a memory, on which at least one program is stored, wherein when the at least one program is executed by the at least one processor, the at least one processor is enabled to implement any one of the information synchronization methods mentioned above.

The processor is a device having a data processing capability, and includes, but is not limited to, a central processing unit (CPU), and the like. The memory is a device having a data storage capability, and includes, but is not limited to, a random access memory (RAM, more specifically, an SDRAM, a DDR, and the like), a read-only memory (ROM), an electrically erasable programmable read-only memory (EEPROM), and a flash memory (FLASH). At least one I/O interface (read/write interface) 503 is connected between the processor 501 and the memory 502, and can implement information interaction between the processor 501 and the memory 502, and includes, but is not limited to, a data bus (Bus), and the like.

In some embodiments, the processor, the memory, and other components of the computing device are connected to each other via a bus.

According to a sixth aspect, the embodiments of the present disclosure provide a computer readable medium, on which a computer program is stored, and when being executed by a processor, the program implements any one of the foregoing information synchronization methods.

FIG. 15 is a constitutional block diagram of a secondary node according to the embodiments of the present disclosure.

In a seventh aspect, referring to FIG. 15, the embodiments of the present disclosure provide a secondary node, including:
an information configuration module 1501, configured to configure first information; and
a first information communication module 1502, configured to send a first message to a first master node, wherein the first message carries the first information.

The first information includes at least one of:
whether an SRBk corresponding to the secondary node has a capability of supporting fast recovery of a primary radio link failure; and
whether the SRBk corresponding to the secondary node is in a state of supporting fast recovery of the primary radio link failure;
wherein k is any integer greater than or equal to 3, and different secondary nodes corresponding to the same master node correspond to different values of k.

In some embodiments, the first information communication module 1502 is further configured to:
receive a second message returned by the first master node, wherein the second message carries second information, and the second information includes information indicating whether the first master node enables or configures or activates UE to perform fast recovery of the primary radio link failure via the SRBk.

In some embodiments, the first message is an SN modification request message, and the second message is an SN modification acknowledgement message. In some embodiments, the SN modification request message may also be referred to as an SgNB modification request message, or an SeNB modification request message, or an S-node modification request message; and the SN modification acknowledgement message may also be referred to as an SgNB modification acknowledgement message, an SeNB modification acknowledgement message, or an S-node modification acknowledgement message.

In other embodiments, the first message is an SN state indication message. In some embodiments, the SN state indication message may be referred to as an SeNB state indication message, or an SgNB state indication message, or an S-node state indication message.

In some embodiments, the first information communication module 1502 is further configured to:
  receive a third message sent by the first master node, and send the third message to UE, wherein the third message carries at least one SRBk selected by the first master node and third information, and the third information includes information indicating whether the first master node enables or configures or activates the UE to perform fast recovery of the primary radio link failure; and
  receive a fourth message from the UE, and send the fourth message to the first master node.

In some embodiments, the third message further carries a priority of each of the at least one selected SRBk for subsequent fast recovery of the primary radio link failure.

In some embodiments, the third message is an RRC reconfiguration message, and the fourth message is an RRC reconfiguration complete message.

The specific implementation process of the secondary node is the same as the specific implementation process of the information synchronization method applied to the secondary node in the foregoing embodiment, and is not described herein again.

Figure 16:
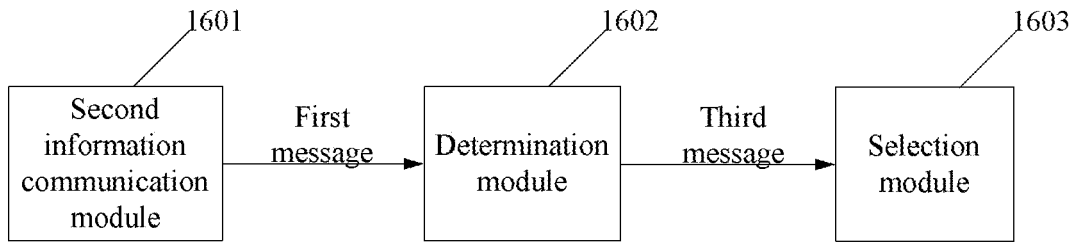
FIG. 16 is a constitutional block diagram of a master node according to the embodiments of the present disclosure.

FIG. 16 is a constitutional block diagram of a master node according to the embodiments of the present disclosure.

In an eighth aspect, referring to FIG. 16, the embodiments of the present disclosure provide a master node, including:
  a second information communication module 1601, configured to receive at least one first message sent by at least one secondary node, wherein each of the at least one first message carries first information, and the first information includes at least one of: whether an SRBk corresponding to the secondary node has a capability of supporting fast recovery of a primary radio link failure; and whether the SRBk corresponding to the secondary node is in a state of supporting fast recovery of the primary radio link failure, wherein k is any integer greater than or equal to 3, and different secondary nodes corresponding to the same master node correspond to different values of k;
  a determination module 1602, configured to determine third information according to the first information in the at least one first message sent by the at least one secondary node, wherein the third information includes information indicating whether the first master node enables or configures or activates UE to perform fast recovery of the primary radio link failure; and
  a selection module 1603, configured to, in a case where the third information is information indicating that the first master node enables or configures or activates the UE to perform fast recovery of the primary radio link failure, select, from the at least one SRBk indicated in the first information carried in the at least one first message, at least one SRBk for the UE to perform fast recovery of the primary radio link failure.

In some embodiments, the second information communication module 1601 is further configured to:
  respectively return a second message to the secondary node corresponding to each of the at least one SRBk indicated in the first information carried in the at least one first message, wherein the second message carries second information;
  wherein the second information in the second message returned to the secondary node corresponding to each selected SRBk is information indicating that the first master node enables or configures or activates the UE to perform fast recovery of the primary radio link failure via the SRBk; and
  the second information in the second message returned to the secondary node corresponding to each non-selected SRBk is information indicating that the first master node disables or de-configures or de-activates the UE from performing fast recovery of the primary radio link failure via the SRBk.

In some embodiments, the first message is an SeNB modification request message, and the second message is an SeNB modification acknowledgement message; or
  the first message is an S-node modification request message, and the second message is an S-node modification acknowledgement message.

In other embodiments, the first message may be any one of: an SgNB state indication message or an S-node state indication message.

In some embodiments, the second information communication module 1601 is further configured to:
  send, according to the at least one selected SRBk, a third message to the UE or the at least one secondary node, wherein the third message carries the at least one selected SRBk and the third information; and
  receive a fourth message sent by the UE or the at least one secondary node.

In some embodiments, the third message further carries a priority of each of the at least one selected SRBk for subsequent fast recovery of the primary radio link failure.

In some embodiments, the third message is an RRC reconfiguration message, and the fourth message is an RRC reconfiguration complete message.

In some embodiments, the second information communication module 1601 is further configured to:
  send a fifth message to a second master node, wherein the fifth message carries first information corresponding to each of the at least one secondary node.

In some embodiments, the fifth message is a handover request message.

The specific implementation process of the master node is the same as the specific implementation process of the information synchronization method applied to the first master node in the foregoing embodiment, and is not further described herein.

Figure 17:
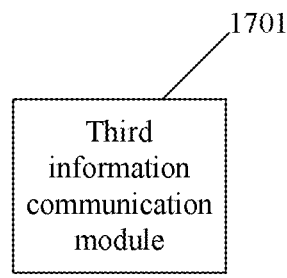
FIG. 17 is a constitutional block diagram of UE according to the embodiments of the present disclosure.

FIG. 17 is a constitutional block diagram of UE according to the embodiments of the present disclosure.

In a ninth aspect, referring to FIG. 17, the embodiments of the present disclosure provide a UE, including:
  a third information communication module 1701, configured to receive a third message sent by a first master node or a secondary node, and return a fourth message to the first master node or the secondary node, wherein the third message carries at least one SRBk selected by the first master node and third information, and the third information includes information indicating whether the first master node enables or configures or activates the UE to perform fast recovery of a primary radio link failure.

In some embodiments, the third message further carries a priority of each of the at least one selected SRBk for subsequent fast recovery of the primary radio link failure.

In some embodiments, the third message is an RRC reconfiguration message, and the fourth message is an RRC reconfiguration complete message.

The specific implementation process of the UE is the same as the specific implementation process of the method for synchronizing information applied to the UE in the foregoing embodiment, and is not further described herein.

Figure 18:
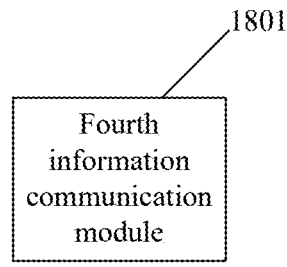
FIG. 18 is a constitutional block diagram of another master node according to the embodiments of the present disclosure.
Figure 19:
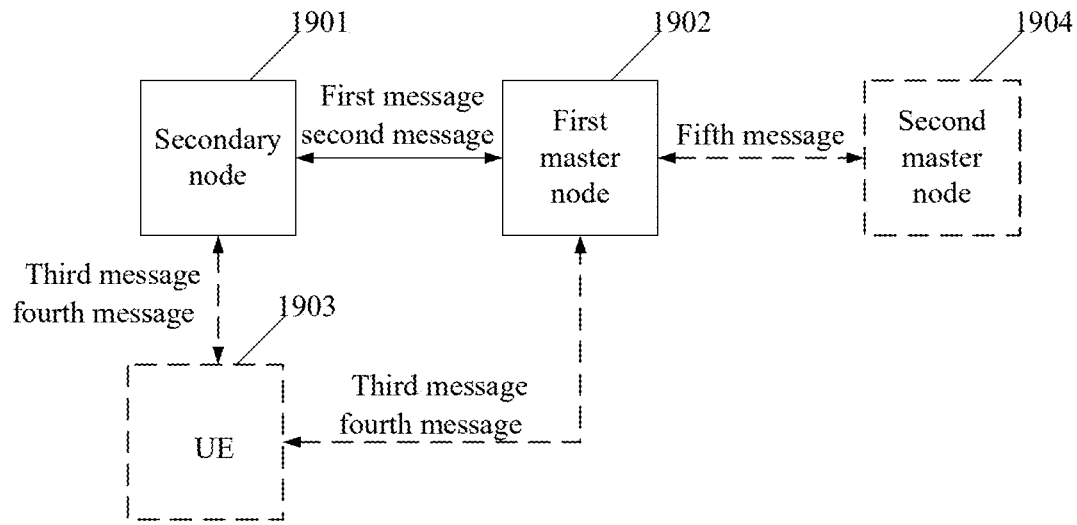
FIG. 19 is a composition block diagram of an information synchronization system according to the embodiments of the present disclosure.

FIG. 18 is a constitutional block diagram of another master node according to the embodiments of the present disclosure.

In a tenth aspect, referring to FIG. 18, the embodiments of the present disclosure provide another master node, including:

a fourth information communication module 1801, configured to receive a fifth message sent by the first master node, wherein the fifth message carries first information corresponding to each of at least one secondary node corresponding to the first master node, and the first information includes at least one of: whether an SRBk corresponding to the secondary node has a capability of supporting fast recovery of a primary radio link failure; and whether the SRBk corresponding to the secondary node is in a state of supporting fast recovery of the primary radio link failure, wherein k is any integer greater than or equal to 3, and different secondary nodes corresponding to the same master node correspond to different values of k.

In some embodiments, the fifth message is a handover request message.

The specific implementation process of the master node is the same as the specific implementation process of the information synchronization method applied to the second master node in the foregoing embodiments, and is not further described herein.

FIG. 18 is a composition block diagram of an information synchronization system according to the embodiments of the present disclosure.

In an eleventh aspect, referring to FIG. 18, the embodiments of the present disclosure provide an information synchronization system, including: at least one secondary node 1801 and a first master node 1802.

The secondary node 1801 is configured to configure first information, wherein the first information includes at least one of: whether an SRBk corresponding to the secondary node has a capability of supporting fast recovery of a primary radio link failure; and whether the SRBk corresponding to the secondary node is in a state of supporting fast recovery of the primary radio link failure, wherein k is any integer greater than or equal to 3, and different secondary nodes corresponding to the same master node correspond to different values of k; and the secondary node 1801 is configured to send a first message to a first master node, wherein the first message carries the first information.

The first master node 1802 is configured to receive at least one first message sent by the at least one secondary node 1801, wherein each of the at least one first message carries first information; determine third information according to the first information in the at least one first message sent by the at least one secondary node 1801, wherein the third information includes information indicating whether the first master node enables or configures or activates UE to perform fast recovery of the primary radio link failure; and in a case where the third information is information indicating that the first master node enables or configures or activates the UE to perform fast recovery of the primary radio link failure, select, from the at least one SRBk, at least one SRBk for the UE to perform fast recovery of the primary radio link failure.

In some embodiments, the secondary node 1801 is further configured to:

receive a second message returned by the first master node, wherein the second message carries second information, wherein the second information includes information indicating whether the first master node enables or configures or activates the UE to perform fast recovery of the primary radio link failure via the SRBk;

The first master node 1802 is further configured to:

respectively return a second message to the secondary node corresponding to each of the at least one SRBk, wherein the second message carries second information.

The second information in the second message returned to the secondary node corresponding to each selected SRBk is information indicating that the first master node enables or configures or activates the UE to perform fast recovery of the primary radio link failure via the SRBk.

The second information in the second message returned to the secondary node corresponding to each non-selected SRBk is information indicating that the first master node disables or de-configures or de-activates the UE from performing fast recovery of the primary radio link failure via the SRBk.

In some embodiments, the first message is an SN modification request message, and the second message is an SN modification acknowledgement message. In some embodiments, the SN modification request message may also be referred to as an SgNB modification request message, or an SeNB modification request message, or an S-node modification request message; and the SN modification acknowledgement message may also be referred to as an SgNB modification acknowledgement message, an SeNB modification acknowledgement message, or an S-node modification acknowledgement message.

In other embodiments, the first message is an SN state indication message. In some embodiments, the SN state indication message may be referred to as an SeNB state indication message, or an SgNB state indication message, or an S-node state indication message.

In some embodiments, first master node 1802 is further configured to:

send, according to the at least one selected SRBk, a third message to the UE or the at least one secondary node 1801, wherein the third message carries the at least one selected SRBk and third information; and receive a fourth message sent by the UE or the at least one secondary node 1801;

The secondary node 1801 is further configured to:

receive a third message sent by the first master node, and send the third message to the UE; and receive a fourth message of the UE, and send the fourth message to the first master node.

The information synchronization system may further include UE 1803.

The UE 1803 is configured to receive the third message sent by the first master node or the secondary node, and return the fourth message to the first master node or the secondary node.

In some embodiments, the third message further carries a priority of each of the at least one selected SRBk for subsequent fast recovery of the primary radio link failure.

In some embodiments, the third message is an RRC reconfiguration message, and the fourth message is an RRC reconfiguration complete message.

In some embodiments, the first master node 1802 is further configured to:
- send a fifth message to a second master node, wherein the fifth message carries first information corresponding to each of the at least one secondary node corresponding to the first master node.

The information synchronization system may further include:
- a second master node 1804, which is configured to receive the fifth message sent by the first master node.

In some embodiments, the fifth message is a handover request message.

The specific implementation process of the information synchronization system is the same as that of the information synchronization method in the foregoing embodiment, and is not further described herein.

Those having ordinary skill in the art can appreciate that the functional blocks/units in all or some of the operations, systems, and apparatuses of the methods provided above can be implemented as software, firmware, hardware, and any suitable combination thereof. In a hardware implementation, the division between functional modules/units referred to in the above description does not necessarily correspond to the division of physical components; for example, one physical component may have multiple functions, or one function or operation may be cooperatively performed by several physical components. Some or all of the physical components may be implemented as software executed by a processor, such as a central processor, a digital signal processor, or a microprocessor; or may be implemented as hardware; or may be implemented as an integrated circuit, such as an application specific integrated circuit. Such software may be distributed on computer readable media, which may include computer storage media (or non-transitory media) and communication media (or transitory media). As is well known to those having ordinary skill in the art, the term computer storage media includes both volatile and nonvolatile, removable and non-removable media implemented in any method or technology for storage of information (such as computer readable instructions, data structures, program modules, or other data). Computer storage media includes, but is not limited to, RAM, ROM, EEPROM, flash memory or other memory technology, CD-ROM, digital versatile discs (DVD) or other optical disk storage, magnetic cassettes, magnetic tape, magnetic disk storage or other magnetic storage devices, or any other medium which can be used to store the desired information and can be accessed by a computer. In addition, communication media typically embodies computer readable instructions, data structures, program modules, or other data in a modulated data signal such as a carrier wave or other transport mechanism and may include any information delivery media as is known to those having ordinary skill in the art.

Exemplary embodiments have been disclosed herein. While specific terms are employed, the terms are used and should be interpreted in a generic and descriptive sense only and not for purposes of limitation. In some instances, as would be apparent to those having ordinary skill in the art, features, characteristics, and/or elements described in connection with a particular embodiment may be used separately or in combination with features, characteristics, and/or elements described in connection with other embodiments unless specifically indicated otherwise. It will thus be understood by those having ordinary skill in the art that various changes in form and details may be made therein without departing from the scope of the disclosure as set forth in the appended claims.

What is claimed is:

1. An information synchronization method applied to a secondary node, the method comprising:
   configuring first information; and
   sending a first message to a first master node, wherein the first message carries the first information;
   wherein the first information comprises at least one of:
   whether a Signaling Radio Bearer (SRB) k corresponding to the secondary node has a capability of supporting fast recovery of a primary radio link failure; and
   whether the SRBk corresponding to the secondary node is in a state of supporting fast recovery of the primary radio link failure;
   k is an integer greater than or equal to 3, and different secondary nodes corresponding to the same master node correspond to different values of k.

2. The method according to claim 1, further comprising:
   receiving a second message returned by the first master node, wherein the second message carries second information, and the second information comprises information indicating whether the first master node enables or configures or activates User Equipment (UE) to perform fast recovery of the primary radio link failure via the SRBk.

3. The method according to claim 2, wherein the first message is a Secondary Node (SN) modification request message, and the second message is an SN modification acknowledgement message.

4. The method according to claim 1, wherein the first message is a Secondary Node (SN) state indication message.

5. The method according to claim 1, further comprising:
   receiving a third message sent by the first master node, and sending the third message to User Equipment (UE), wherein the third message carries at least one SRBk selected by the first master node and third information, and the third information comprises information indicating whether the first master node enables or configures or activates the UE to perform fast recovery of the primary radio link failure; and
   receiving a fourth message from the UE, and sending the fourth message to the first master node.

6. The method according to claim 5, wherein the third message further carries a priority of each selected SRBk for subsequent fast recovery of the primary radio link failure; or,
   the third message is a Radio Resource Control (RRC) reconfiguration message, and the fourth message is an RRC reconfiguration complete message.

7. An information synchronization method applied to a first master node, the method comprising:
   receiving at least one first message sent by at least one secondary node, wherein each first message carries first information, and the first information comprises at least one of: whether a Signaling Radio Bearer (SRB) k corresponding to the secondary node has a capability of supporting fast recovery of a primary radio link failure; and whether the SRBk corresponding to the secondary node is in a state of supporting fast recovery of the primary radio link failure, k is any integer greater than or equal to 3, and different secondary nodes corresponding to the same master node correspond to different values of k;

determining third information according to the first information in the at least one first message sent by the at least one secondary node, wherein the third information comprises information indicating whether the first master node enables or configures or activates User Equipment (UE) to perform fast recovery of the primary radio link failure; and in a case where the third information is information indicating that the first master node enables or configures or activates the UE to perform fast recovery of the primary radio link failure, selecting, from the at least one SRBk indicated in the first information carried in the at least one first message, at least one SRBk for the UE to perform fast recovery of the primary radio link failure.

8. The method according to claim 7, further comprising:
respectively returning a second message to the secondary node corresponding to each SRBk indicated in the first information carried in the at least one first message, wherein the second message carries second information;

wherein the second information in the second message returned to the secondary node corresponding to each selected SRBk is information indicating that the first master node enables or configures or activates the UE to perform fast recovery of the primary radio link failure via the SRBk; and the second information in the second message returned to the secondary node corresponding to each non-selected SRBk is information indicating that the first master node disables or de-configures or de-activates the UE from performing fast recovery of the primary radio link failure via the SRBk.

9. The method according to claim 8, wherein the first message is a Secondary Node (SN) modification request message, and the second message is an SN modification acknowledgement message.

10. The method according to claim 7, wherein the first message is a Secondary Node (SN) state indication message.

11. The method according to claim 7, further comprising:
sending, according to the at least one selected SRBk, a third message to the UE or the at least one secondary node, wherein the third message carries the at least one selected SRBk and the third information; and receiving a fourth message sent by the UE or the at least one secondary node.

12. The method according to claim 11, wherein the third message further carries a priority of each selected SRBk for subsequent fast recovery of the primary radio link failure; or, the third message is a Radio Resource Control (RRC) reconfiguration message, and the fourth message is an RRC reconfiguration complete message.

13. The method according to claim 7, further comprising:
send a fifth message to a second master node, wherein the fifth message carries first information corresponding to each secondary node.

14. The method according to claim 13, wherein the fifth message is a handover request message.

15. An information synchronization method applied to User Equipment (UE), the method comprising:
receiving a third message sent by a first master node or a secondary node, and returning a fourth message to the first master node or the secondary node, wherein the third message carries at least one Signaling Radio Bearer (SRB) k selected by the first master node and third information, and the third information comprises information indicating whether the first master node enables or configures or activates the UE to perform fast recovery of a primary radio link failure.

16. The method according to claim 15, wherein the third message further carries a priority of each selected SRBk for subsequent fast recovery of the primary radio link failure; or, the third message is a Radio Resource Control (RRC) reconfiguration message, and the fourth message is an RRC reconfiguration complete message.

17. An electronic device, comprising:
at least one processor; and
a storage device, on which at least one program is stored, wherein when the at least one program is executed by the at least one processor, the at least one processor implements the method according to claim 1.

18. A non-transitory computer readable storage medium, on which a computer program is stored, wherein the program implements the method according to claim 1 when being executed by a processor.

19. An electronic device, comprising:
at least one processor; and
a storage device, on which at least one program is stored, wherein when the at least one program is executed by the at least one processor, the at least one processor implements the method according to claim 7.

20. An electronic device, comprising:
at least one processor; and
a storage device, on which at least one program is stored, wherein when the at least one program is executed by the at least one processor, the at least one processor implements the method according to claim 15.

* * * * *